US008727439B2

(12) United States Patent
Herzberg

(10) Patent No.: US 8,727,439 B2
(45) Date of Patent: May 20, 2014

(54) INTEGRATED SINGLE, MULTIPLE AND ROLLING CAR SEAT SYSTEMS

(76) Inventor: Louis Paul Herzberg, Monsey, NY (US)

( * ) Notice: Subject to any disclaimer, the term of this patent is extended or adjusted under 35 U.S.C. 154(b) by 0 days.

(21) Appl. No.: 13/585,613

(22) Filed: Aug. 14, 2012

(65) Prior Publication Data

US 2013/0200671 A1 Aug. 8, 2013

Related U.S. Application Data

(63) Continuation-in-part of application No. PCT/US2012/002427, filed on Feb. 6, 2012.

(51) Int. Cl.
*A47C 3/04* (2006.01)
*B60N 2/26* (2006.01)
(52) U.S. Cl.
USPC ............ 297/250.1; 297/233; 297/239
(58) Field of Classification Search
USPC ............ 297/183.1, 233, 239, 250.1
See application file for complete search history.

(56) References Cited

U.S. PATENT DOCUMENTS

| 3,575,465 | A | * | 4/1971 | Dolby et al. | 297/118 |
| 4,854,638 | A | * | 8/1989 | Marcus et al. | 297/256.11 |
| 5,384,946 | A | * | 1/1995 | Sundstedt et al. | 297/238 |
| 5,601,334 | A | * | 2/1997 | Marks | 297/238 |
| 5,823,547 | A | * | 10/1998 | Otobe et al. | 280/30 |
| 6,237,995 | B1 | * | 5/2001 | Dierickx | 297/130 |
| 6,676,213 | B1 | * | 1/2004 | Dlugos | 297/256.11 |
| 7,011,368 | B2 | * | 3/2006 | Barth et al. | 297/239 |
| 7,794,015 | B1 | * | 9/2010 | Ashby | 297/248 |
| 8,240,762 | B2 | * | 8/2012 | Herzberg | 297/256.16 |
| 2011/0291450 | A1 | * | 12/2011 | Gillett et al. | 297/250.1 |

\* cited by examiner

*Primary Examiner* — Philip Gabler
(74) *Attorney, Agent, or Firm* — Louis P. Herzberg

(57) ABSTRACT

Apparatus is provided for integrated, single and multiple person vehicle car seats, modular car seat systems, dual person car seats, variable base height and width car seats, car seat-inserts inserted into another car seat, foldable, for use in a land, sea or air vehicle, mounted onto the vehicle's built-in seat and used for securing a car seat user within a vehicle's regular seating positions. Car seat systems include components enabling addition or removal of seating positions for a desired number of car seat users as needed, limited only by available width and height space of the vehicle seat onto which it is mounted.

20 Claims, 8 Drawing Sheets

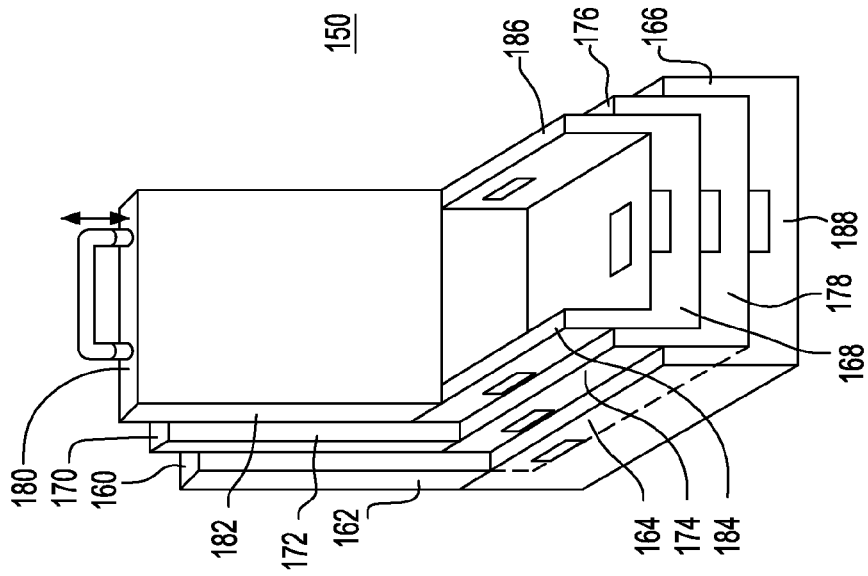
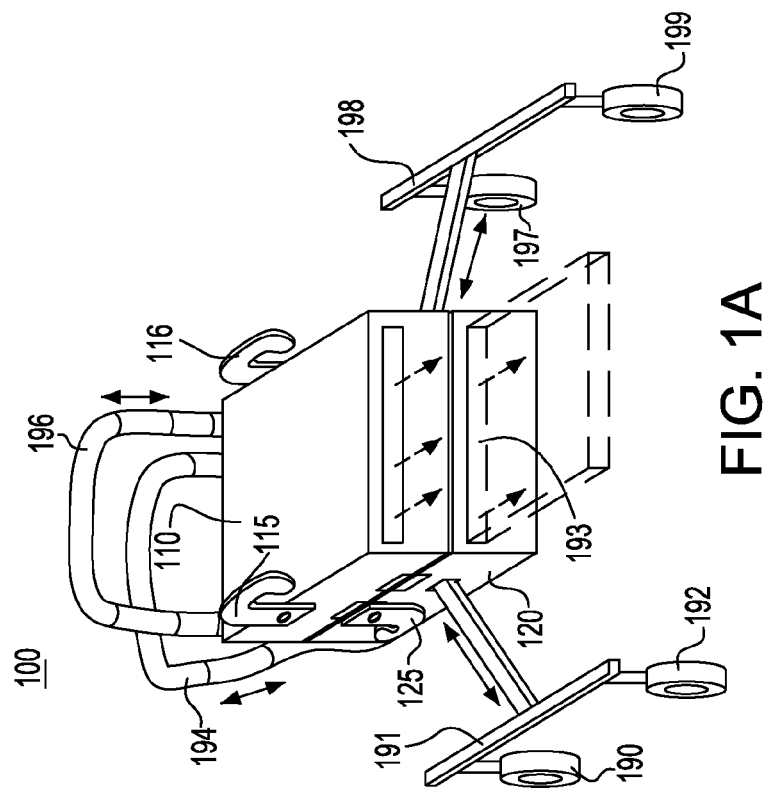

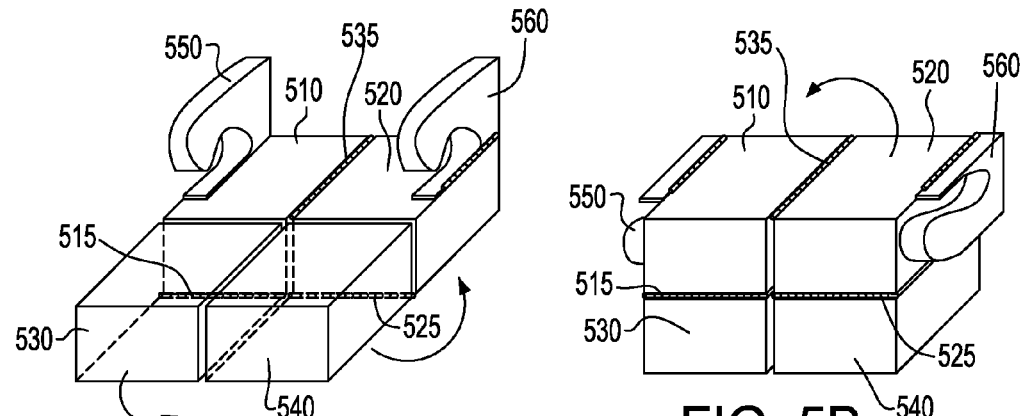
FIG. 5A
FIG. 5B
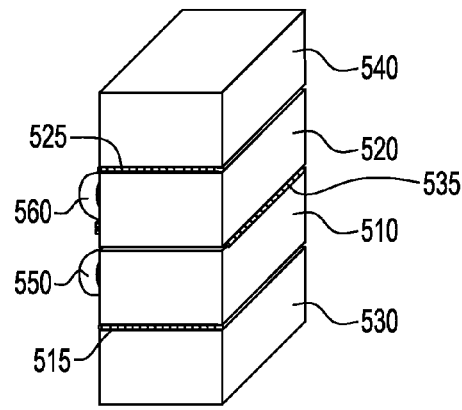
FIG. 5C
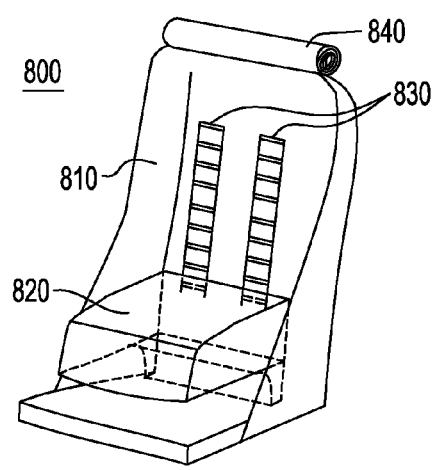
FIG. 8
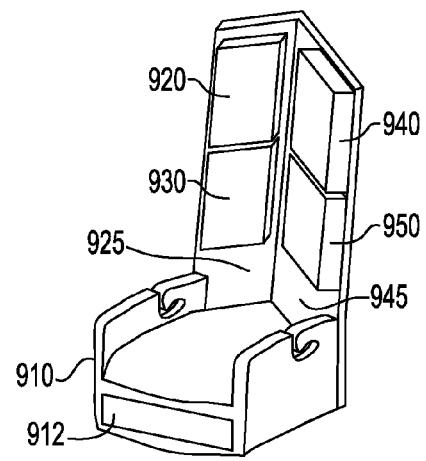
FIG. 9

INTEGRATED SINGLE, MULTIPLE AND ROLLING CAR SEAT SYSTEMS

PRIORITY

This application claims priority from PCT Application filed Feb. 6, 2012, entitled "Integrated Single and Multiple Car Seat Systems," assigned PCT Serial number PCT/US12/2427, and claims priority from US Application filed Feb. 7, 2011, entitled "Single, Multiple and Integrated Car Seat Systems," assigned Serial number U.S. Ser. No. 13/022,183, and U.S. Pat. No. 8,240,762, These applications are included herein by reference in entirety for all purposes.

FIELD OF THE INVENTION

The present invention relates to apparatus for integrated, single and multiple person vehicle car seats and specialized car seats. More particularly, but not exclusively, it relates to apparatus and methods for integrated car seat systems, rolling car seats, dual person car seats, overlapping car seats, insertable car seats, foldable car seats, variable car seat bases, height and/or width car seats, multiple person car seats, and combinations of these.

BACKGROUND OF THE INVENTION

The present invention is concerned with provision of vehicle car seats for single and multiple car seat users. Heretofore, each vehicle car seat was a removable seat generally equipped with a restraining device or harness that can be fastened to the seat of a vehicle for securing a person being a car seat user in the vehicle. Most often it is a seat that is portable for use in the automobile and fastens onto a car's built-in [regular] seat and is used for securing a child in a car's regular seating position. The seat is removable and is designed to hold the child safely while riding in the automobile and attaches to a standard seat with hooks or straps and detaches from the standard seat by unhooking the hooks and/or straps.

Herein, a person using and/or needing a car seat is referred to as a car seat user. Although reference is made to infants, toddlers and/or children, this invention is applicable to any car seat user that uses and/or needs a car seat when traveling in a land, sea or air vehicle. Thus the term 'car seat' is used for a removable vehicle seat generally equipped with a restraining device or harness and can be fastened to a regular seat of a vehicle for securing a car seat user in the vehicle. In some cases a car seat system is separately mounted in a vehicle not necessarily using or being mounted upon a vehicle seat.

It is noted that when seating is required for a plurality of car seat users, a separate car seat is needed for each car seat user. Thus each car seat user uses up car width of a separate regular seat built into the vehicle. Thus a family or group including a plurality of children and/or other car seat users is limited in seating capacity by the adult seating capacity of the vehicle being used. This limitation manifests itself as a serious problem for large families and/or groups that find it difficult to meet children car seat needs for all their children or to meet the needs of car seat users of the group. These families must either not meet car seating requirements or leave one or more children out of the vehicle. It would be advantageous to find a way to better utilize the adult seating capacity in a vehicle to provide more seating for persons in car seats than is provided by the vehicle's adult seating capacity. Besides cars, this may be particularly useful in vans, buses or other land, water or air vehicles.

It is further noted that when a car seat application is in need of a plurality of car seats to provide seating for a varying number of car seat users. Heretofore, the vehicle must be provided with separate or attached car seats for the highest number of car seat users anticipated. The combination of seats to provide seating positions for the maximum number of car seat users anticipated. Thus when it is anticipated to have 2, 3, 4, 5, etc car seat users in the vehicle at the same time the vehicle must store 2, 3, 4, 5, etc separate car seats. This generally uses up a significant amount of vehicle storage. It is advantageous to provide a car seat that includes a plurality of separate car seats in a single integral package.

SUMMARY OF THE INVENTION

It is therefore an object of the invention to obviate and/or mitigate disadvantages associated with the use of heretofore conventional car seats in vehicles carrying one or more persons needing use of a car seat when seated in a vehicle, and overcomes the need to separately store in the vehicle car seats not yet being used.

In another aspect of the present invention, in some embodiments some car seats employ internal car seat restraints and/or a seat belt of the vehicle. In some cases this may be the same seat belt employed by the first car seat. In some cases this requires use of a seat belt extender to properly restrain the first and second, etc., car seats. In some cases there is provided a special seat belt for each car seat to restrain the person in that car seat.

In some embodiments, the number of car seat users provided for by the integrated and/or multiple person car seat and/or car seat system is greater than the number of adult car seat users in the same vehicle space width. It is preferable that the integrated car seat be designed such that the seating positions enable a car seat user to face other car seat user.

In a still further aspects of the present invention, there is provided integrated car seat systems packaged such as to mounting a plurality of removably attached car seats on top of, under, on a side of, and/or on the back of one another until needed for use.

In still further aspects of the present invention, there are provided descriptions, advantages and embodiments for dual person car seats, overlapping car seats, changeable car seats, insertable car seats, variable width car seats and multiple person car seats. Some embodiments use a combination of the novelties described herein.

In some embodiments a car seat package includes wheels that allow wheeling one or more car seat users in a respective car seat, when said respective car seat is removed from the vehicle In some case this includes a pullout foot rest to support the legs of the car seat user.

BRIEF DESCRIPTION OF THE DRAWINGS

The foregoing and further features of the present invention will be more readily understood from the following description of advantageous embodiments, by way of example only, with reference to the accompanying [not to scale] drawings, in which:

FIGS. 1A and 1B show example embodiments of stationary and roll-able integrated car seat systems in accordance with the present invention.

FIG. 5 shows a diagram of an embodiment of a foldable car seat in accordance with the present invention;

FIG. 8 shows an example of a variable height car seat in accordance with the present invention;

FIG. 9 shows an example embodiment of an integrated car seat having two or four car seats mountable on a VEE shaped back of another car seat in accordance with the present invention.

DESCRIPTION OF THE INVENTION

Figure 2:
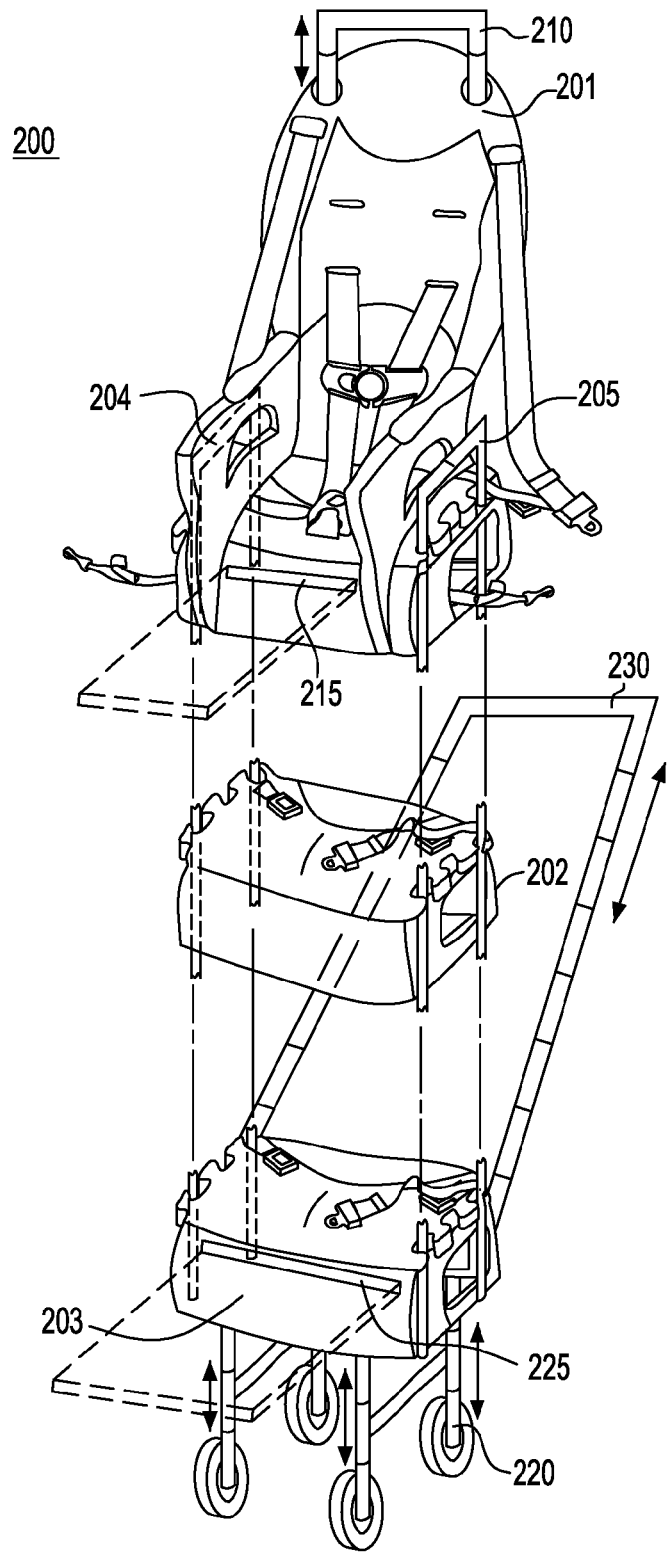
FIG. 2 shows a first example of a three seat integrated car system in accordance with the present invention.

The present invention obviates and/or mitigates disadvantages associated with many previously known vehicle car seats. Heretofore, car seats provided car seat seating for a single person. Each car seat used-up the vehicle space width allocated to an adult seat. This is disadvantageous to large families or groups that include a plurality of persons needing use of a car seat when seated in a vehicle. It is most usual that the number of car seat users varies with a particular need at a particular time. This invention provides for integrated car seat systems and/or multiple person car seats to enable usage of only the particular number of seats needed at that time. It provide more seating positions for persons in a car seat than provided for adults in the car width taken up by the car seats, and/or better seating for car seat users, especially for seating multiple car seat persons in a vehicle.

This invention also provides an integrated car seat system. Often car seats are large and relatively clumsy packages to store with other storage items in a vehicle. Sometimes car seats are mounted in the vehicle even when not all car seats are used. This unnecessarily limits seating of regular vehicle passengers. An integrated car seat system solves this problem by only using a car seat position when actually needed by a car seat user. It also alleviates the problem of storing unused car seats in the vehicle storage when these are unused. Unused car seats remain mounted with a used seat until needed.

In the following the words 'right' and 'left' are used to facilitate understanding of embodiments presented herein. This is not to be considered a needed limitation, and 'right' and 'left' may be interchanged in accordance with a particular implementation. The particular implementations are only exemplary enablements, in so much that the concepts and advantages may be achieved by other implementations which are also deemed to be included and protected by the claims of this invention.

The integrated system is formed to provide two or more car seats being co-located on top of, on the back of, on the side of and/or under one another. Thus, on some embodiments, one or more additional car seats are mountable on a back, under or on one or both sides of a first car seat. Generally, car seats within an integrated system are removably attached to one another. In some embodiments at least one car seat remains attached to the first car seat even when positioned to provide a seating position for another car seat user.

Thus, when the integrated system is in a closed state, it provides a single sitting position for a singular car seat user sitting in a first car seat of the integrated system. When a second sitting position is needed for a second car seat user, a second car seat is separated from the integrated system, or epositioned for use of another car seat user. If a third car seat is included in the integrated system, that car seat is separated out from the first and/or second car seat to provide a seating position for a third car seat user, etc., as and when needed.

Thus, in some embodiments one or more additional car seats remains attached to the first or another car seat when removed from its mounted position while providing seating for another car seat user. In other embodiments, even when an additional seating position is needed, the user has the option of leaving the additional car seat attached to the first or another car seat or removing that additional car seat from the integrated car seat system for placement in a desired vehicle position.

In general, the car seats systems, the integrated car seat systems and/or multiple person car seats of the present invention may provide any or all of the amenities of previously known car seats. The present invention is thus useable to provide features and general aspects of standard prior and developing car seat technology. It is upon this technology that the present invention is providing the special features described herein.

It is noted that any or all of the car seats in the integrated system, multiple system and single system are adaptable to features of standard car seats. In particular the present invention provides for a multiplicity of these features in more than one car seat. Thus a car seat may contain a compartment for storing items needed by the vehicle user, the car seat user and external components for this car seat or any other car seat In a particular embodiment, the present invention provides novel vehicle seating systems. An integrated car seat system is formable as an integral unit to enable provision of the number of seats for car seat users that fit in the vehicle car seat in which it is incorporated. This also enables purchasers to purchase that portion needed at a particular time. In some cases additional or replacement portions of the integrated system may be purchased separately; subsequent to original purchase, as a family size increases.

In some embodiments multiple person car seat provides for separating seating of number of car seat users using a separator provided for use between adjacent car seat persons. When a car seat separator is used it provides some physical separation between persons sitting in adjacent car seats.

FIG. 1A shows an example of an integrated car seat system 100. An integrated system integrates and brings together car seat components for two or more car seats in a single package being an integral unit. FIG. 1A shows integration of two booster seats 110 and 120. Seats 110 and 120 are kept and held together when system 100 is used for a single car seat user. When needed for two car seat users, seats 110 and 120 are separated.

In some embodiments seats 110 and 120 are physically separated. In other embodiments they unfold from one another to form two adjacent car seats. For example, unfolding of seat 110 from seat 120 may be accomplished for the two seats in FIG. 1A in the manner shown in FIGS. 3A, B, and C for seats 302 and 320 and/or as shown for car seats 302 and 330. This is described below in the description of FIGS. 3A, B, and C.

Seat 110 shows an upper booster seat, with belt seat attachments 115 and 116. Seat 120 shows an lower booster seat 120, with seat belt attachment mechanism 125 in a lowered position. In some embodiments seat 110 and/or seat 120 form infant seats having attachment mechanism 115, 116 in an up position particularly useful for a forward facing or a rearward facing infant seat. In some embodiments either or both seats 110 and 120 are infant seats.

FIG. 1B shows an example embodiment of a three position integrated car seat system 150 allowing a single package to hold three infant seats 160, 170 and 180. In the embodiment shown, seat 160 has a back portion 162, side portions 164 and 166 and base portion 168. Seat 170 has a back portion 172, side portions 174 and 176, and a base portion 178. Seat 180 has a back portion 182, side portions 184 and 186, and a base portion 188. When attached to each other, seats 160, 170 and 180 form a single package to provide seating for a single car seat user in seat 180. The seat to seat attachment mechanism is such to allow the seats to be separated from the integrated package to provide seating for two or three car seat users.

In some embodiment either seat 160 and/or seat 180 is a booster seat. As with all seat back to seat base attachments, in some embodiments the back portions are inclined backward forming an obtuse angle with its base rather than in a vertical position forming a right angle with its base. This provides better seating for a small infant. Many embodiments use a pad covering the back and/or base portions for seating comfort. In some cases the pad is rolled up on the top of a car seat back and unrolled to cover car seat base and/or the car seat back.

As stated, although, FIG. 1B shows car seat backs 162,172 and 182 to be at a right angle with car seat base 168, 178 and 188, in some embodiments the seat back is formed to be inclined backward, rounded or in a VEE strap, etc. Sometimes, the back is formed to have a curved lower portion meeting with a curved upper portion of the base to which it is attached. In some cases the combination of back and base form an almost flat surface most appropriate for an infant car seat user. This provides a continuous laying portion for the infant.

In some embodiments, an individual car seat, or at least one car seat or car seat combination of seats of an integrated car seat system is provided with wheels. The wheels enable the wheeling of the car seat user in the car seat when that individual or at least one car seat or car seat combination is removed from the vehicle. In some cases more than one car and/or car seat combination is provided with wheels to wheel a plurality of car seat users. In various embodiments, wheels are mounted to be integral with one particular car seat, or with a combination of car seats. In some cases the combination of car seats are packaged together as one car seat. This enables one car seat user to be wheeled. In other cases the car seats in the combination are set to provide seating for two or more car seat users. In these cases, the two car seat users in each separate seat may be wheeled together when only one set of wheels is provided for the combination of seats. The two car seat users may also be wheeled separately when both car seats are provided with separate wheels.

In some embodiments, a car seat is provided with wheels release-ably, remove-ably and/or swing-ably mounted on the car seat. The wheels being held in place in an unreleased position until the car seat or car seat combination is removed from the vehicle, and then released to a released position. Placing the wheels in the released position enables wheeling of the car seat or car seat combination. When the car seat is to be remounted in the vehicle, the wheels are put in the unreleased position. When the car seat is a booster seat, a pullout foot rest is used to support the car seat user's legs.

An example embodiment using wheel pair 190, 192 and wheel pair 197, 199 for a car seat is shown in FIG. 1A to enable make car seat 120 a rolling car seat. Handle 194 is used to push a car seat user in wheeled car seat 120 without car seat 110, or to push a car seat user in car seat 110 with or without car seat 120. Car seat 110 is provided with pullout foot rest 195 to provide support for the car seat user's legs. Car seat 120 is provided with pullout foot rest 193 to provide support for the other car seat user's legs. In some embodiments, the foot rests have a downward incline and/or are rippled. Handle 196 is used to push a car seat user in car seat 110 when it is provided with wheels (not shown) so it should be a rolling car seat, and is separated from car seat 120. When car seat 110 is separated from car seat 120, each separate seat when provided with wheels to be a rolling car seat, is useable to push separate car seat users in car seat 110 and 120. In a similar manner car seat wheels and car seat handle (not shown) are provided to car seat 164 to push car seat system 150.

In some embodiments of a rolling car seat, rather than mounting the wheels on the sides of a rolling car seat, the wheels are tucked under the car seat in an unreleased state. The wheels are released when the car seat is removed from the vehicle. This is an embodiment useful for any or all car seats 160, 170 and 180, of integrated car seat system 150, for any of the seats provided with wheels (not shown). An example embodiment for car seat handle 185 is shown for car seat 180. In some cases, when formed to be rolling car seats, car seats 160, 170 and 180 also have a protruding foot rest (not shown).

It some cases, it is advantageous for the wheels to be large and/or emanate from a lower portion of the car seat having a wheel height extender such as to raise the seat base from the floor upon which it is rolling. This is not so necessary when the car seat is an infant seat when there is no or little need for a foot rest.

An example embodiment of a car seat handle uses a telescopic tube that can be folded back to close, tuck-in and/or otherwise minimize the length of an unused handle. The tube is extended when the handle is used to push a car seat.

In some embodiments, the spacing between wheel pair 190, 192 from wheel pair 197, 199 is increase-able such they are used for pushing seats 110 and 120 when these are mounted along side one another. Thus, two car seat users are pushed by handle 194 and/or 196 using wheels 190, 192 alongside wheels 197, 199. In this case car seat users are alongside each other.

In another embodiment, the spacing of the wheels 190 from wheel 192 and wheels 197 from wheel 199 is variable by forming bars 191 and 198 to extend telescopically. This provides for use of extended wheels when seat 100 is removed from the vehicle and seat 110 and is mountably attached in front of seat 120. Thus a car seat user in seat 110 is in front of a car seat user in seat 120. The combined seat is pushed by handle 194, handle 196 not being extended. Each seat position making up an integrated car seat system is herein referred as a member seat. Each member seat has either or both, a capture mechanism to capture another seat member and/or an attachment mechanism to allow it to be captured by a capture mechanism of another member seat. The capture mechanism is coupled with a release mechanism to allow release of a captured member seat. These mechanisms may be formed in any capture/release mechanism known to those familiar with the capture/release art. The mechanisms may include simple or complex mechanisms or even force-fit/unforce, and/or snap/unsnap release mechanisms.

FIG. 2 shows an example of a three member integrated seat system 200. It includes two individual booster seats 201, and 202, stacked under a forward facing infant seat 203 to form the three seat integrated car seat 200. Seats 201, 202 and 203 are shown to be combined one on top of another, and held together by dual telescopic tubes 204 and 205. Tubes 204 and 205 show an example of external components used with an integrated seat. The telescopic nature of 204 and 205 result in variable tube length to provide a particular length needed when the integrated seat is used for combining the seats 201, 202 and 203 as shown, when combining seats 201 with 202 or 202 with 203, or when 201, 202 and 203 are all separated to be able to provide seating for three car sweat users. In some embodiments, external components 204 and 205 are supplemented with or replaced by a tying body [not shown] to keep together any stacked combination of seats 201, 202 and 203. As described above, in other embodiments seats 201, 202 and 203 are formed to be stacked in any desired combination without any external component.

When it is desired to be able to push around a car seat user in seat 201, wheels 220 and handle 230 are provided. Wheels 220 and handle 230 are also used to push a car seat user in car seat 202, when car seat 201 is separated from seats 202 and 203. Likewise, wheels 220 and handle 230 are also used to push a car seat user in car seat 203, when car seats 201 and 202 are separated from seat 203. In similar fashion, wheels and handles are sometimes provided separately for car seat 201, 202 and 203, to enable pushing separate car seat users in each separate seat. Another example embodiment for rolling car seat system 200, or car seat 201 with or without car seat of a handle 202, uses handle 210 coming out of the upper portion of seat 201. This depends on if and for which car seat of the car seat system 200 wheels are provided.

Figure 3A:
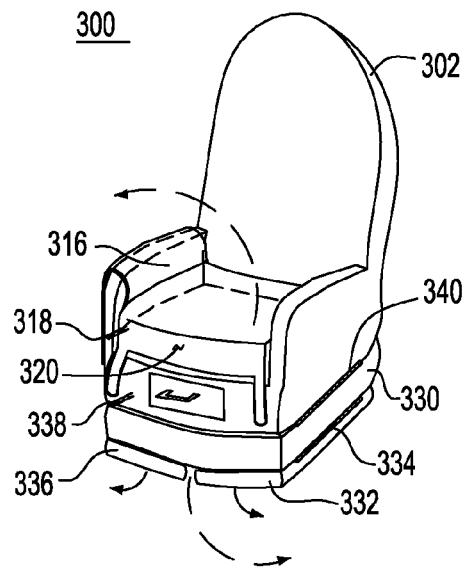
FIG. 3A-C shows another example of a three seat integrated car system in accordance with the present invention.
Figure 3B:
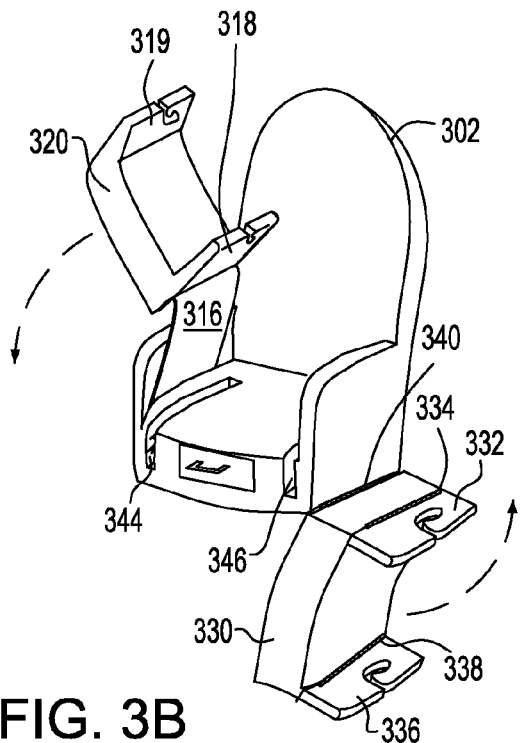
Figure 3C:
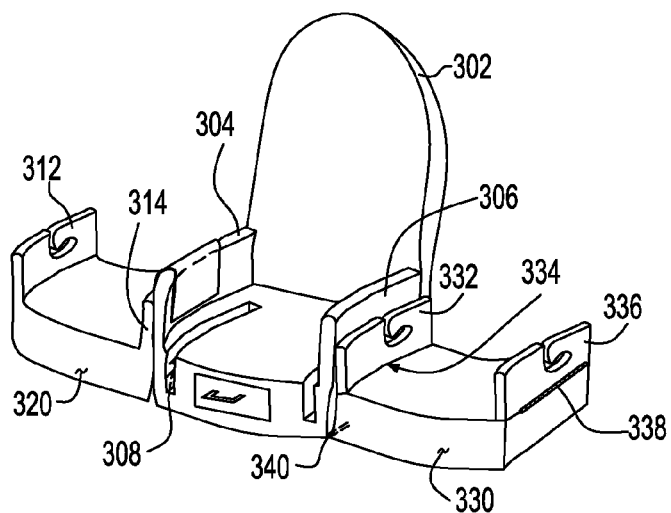

FIG. 3A shows another example of a three seat integrated car system 300. System 300 includes infant seat 302 and booster seats 320 and 330. The base of seat 302 includes grooves 344 and 346 to accept the sides 318 and 319 of seat 320. Seat 320 is attached to seat 302 with detachable flap 316. Seat 330 is hinged to the bottom of seat 302 with hinge 340. This allows seat 330 to swing out from under seat 302 as shown in FIG. 3B. The sides 332 and 336 of seat 330 are hinged to seat 330 with hinges 334 and 338 respectively to enable sides 332 and 336 to be opened as shown in FIG. 3B. Figure shows the 3 seats 320, 302 and 330 in an open usable position. FIG. 3C shows seat 320 adjacent to seat 302 on one side and seat 330 adjacent to seat 302 on the other side. In some embodiments flaps 316 can be opened to release seat 320 from seat 302, and/or hinge 340 can be opened to release seat 330 from seat 302. This release seats 320 and 330 for placement away from seat 302 as desired. In some embodiments, booster seats have no or only minimal sides.

Figure 4A:
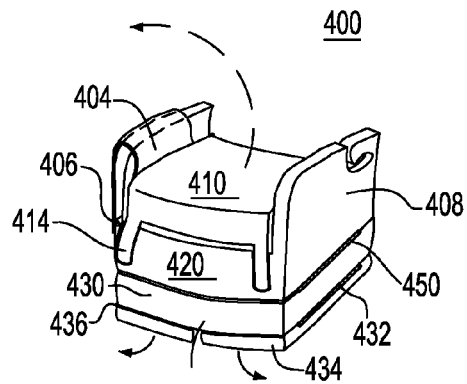
FIGS. 4A-4C show diagrams of examples of different states of a three seat integrated car system in accordance with the present invention.
Figure 4B:
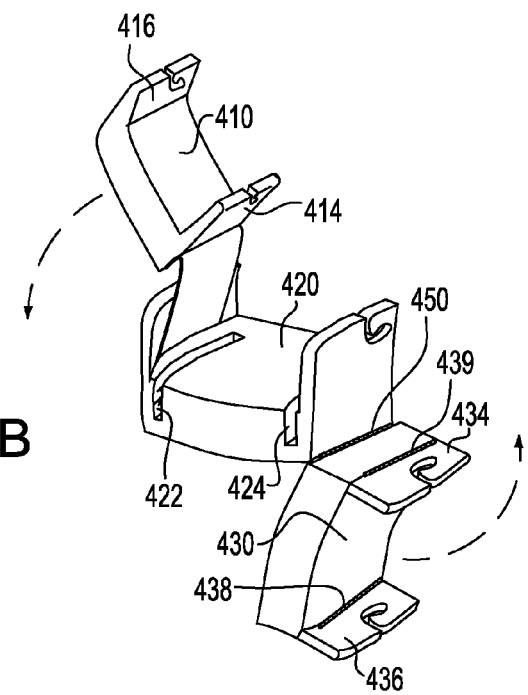
Figure 4C:
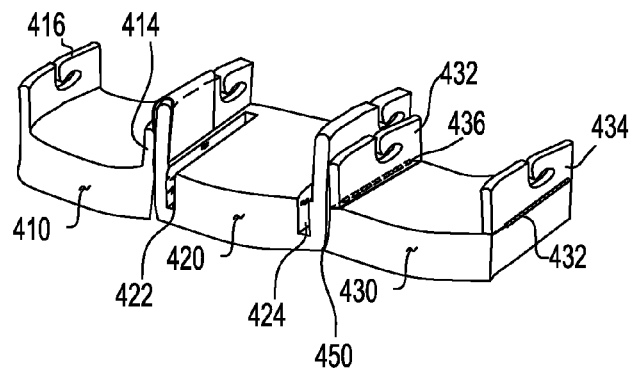

FIGS. 4A-4C show a further embodiment of an integrated car seat system 400. FIG. 4A shows system 400 in a single seat closed position. FIG. 4C shows system 400 in a completely open position. FIG. 4B shows system 400 in an intermediate position. System 400 includes car seat 410 mounted on top of car seat 420 and car seat 420 being mounted on top of car seat 430. The sides 414 and 416 of car seat 410 fit into grooves 422 and 424 of car seat 420. Car seat 410 is attached to car seat 420 with flap 404. In some embodiments flap 404 is detachable so as to separate car seat 410 from car seat 420. Car seat 430 is attached to car seat 420 with detachable hinge 450. Car seat 430 has sides 434 and 436 which are attached by hinges 438 and 436.

FIGS. 5A, 5B and 5C show an embodiment for reducing the size of a seat base by folding. This reduces the horizontal profile of the seat base. Seat 500 is shown to be made up of portions 510, 520, 530 and 540. Portion 510 includes seat belt hook 550. Portion 520 includes seat belt hook 560. Portion 510 is hinged to portion 530 by hinge 515, and portion 520 is hinged to portion 540 by hinge 525. FIG. 5B shows seat 500 when portion 530 is folded under portion 510 and portion 530 is folded under portion 520. In this case the folding reduces the base profile by a factor of two, to one half the original horizontal base profile. In some embodiments, portion 510 is attached to portion 520 with hinge 535. FIG. 5C shows the further reduction of the base profile when the combination of portions 520 and 540 are folded over portions 510 and 530 using hinge 535. The resulting horizontal base profile is one quarter that of the original profile of FIG. 5A.

In some cases portions 510 and 520 are a single portion and 530 and 540 are a single portion. Thus the car seat can only be folded in half. Besides elsewhere, this is also useful for packaging car seats together in an integrated car seat system.

In some embodiments, a folded, a folded car seat is partially mounted on another car seat on a combination of the other car seas base, side and or/back. For example, in cases, when the folded car seat is folded in two, the folded car seat is mounted in the shape of the letter 'L', such that part of the folded car seat is mounted against a side of the other car seat and at a fold the remainder of the folded car seat is mounted on the base or back of the other car seat.

Folding of car seats also generally provides advantageous options for placement and/or packaging of single or multiple car seats.

It is further noted that it is sometimes advantageous to reduce horizontal and/or vertical profile of an object included in an other object. This is useful for packaging car seats together in an integrated car seat system when a car seat is to be mounted on the side, back and/or base of another car seat.

Consider integrated car seat system 600. System 600 includes car seats 610, 620 and 630. Car seats 620 and 630 are mounted on the back 612 of car seat 610

In some cases 620 and 630 are two separate seats. FIG. 6B shows car seats 610, 620 and 630 when each is capable of seating a separate car seat person. In some embodiments seat 620 is coupled to seat 610 with rod mechanism 615, and/or seat 630 is coupled to seat 610 with rod mechanism 625.

In some of these cases each is a folded car seat having a quarter car seat base horizontal profile. When removed from car seat 610 each is unfolded to provide a full car seat person position.

In other embodiments seats 620 and 630 are a single seat 620/630 having a half car seat base horizontal profile. Combined seat 620/630 is unfolded to provide a seating position for a car seat user. In some embodiments car seats 620, 630 and/or combined 620/630 are removably inserted into the back 612 of car seat 610. In some embodiments car seats 620, 630 and/or combined 620/630 are removably inserted into the back 612 of car seat 610. In some embodiments a mat 640 is provided to be unrolled so as to make leaning on the back 612 of a seat 610 more comfortable. A mat of this kind is often also useful for other system seat embodiments.

Figure 7:
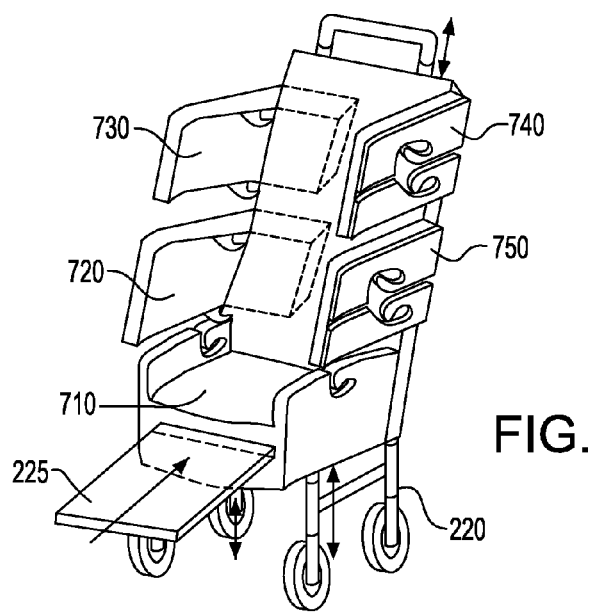
FIG. 7 shows an example embodiment of four car seats mountable on the sides of a third car seat, in accordance with the present invention.

FIG. 7 shows an integrated car seat system 700 which includes, infant car seat 710, 720 and 730 and booster seats 740 and 750. Infant car seats 720 and 730 are mounted on one side of seat 710. The backs 725 and 735 of car seats 730 and 730 are inserted into or behind the back 715 of seat 710. Booster seats 740 and 750 are mounted on the other side of seat 710 and are supported by seat back 715. In some embodiments seat 710 has sides (not shown) to support seat 720, 730, 740 and 750. It is noted that other seat combinations are similarly usable in other embodiments. For example in one embodiment seats 740 and 750 are also infant seats having backs that are also inserted or mounted behind seat back 715.

FIG. 8 shows an embodiment 800 for a variable height car seat base 820 which has its height variable by ladder mechanism 830. The height of car seat base 820 is mechanically adjustable to any of the ladder 830 steps. This is useful for raising and lowering a child in seat 810 as desirable by a particular need or desire. Rolled up pad 840 is unrolled to provide seating comfort for the child after the seat base height is set. Variable height seat base car seats are useful for single, multiple and integrated car seat systems.

FIG. 9 shows still another embodiment of an integrated car seat system 900. System 900 includes car seats 910, 920, 930 and 950. Seat 910 has a 'Vee' shaped back formed of two sides. One side 925 is used to mount seats 920 and 930. The other side 945 is used to mount seats 940 and 950. In some embodiments seats 920, 930, 940 and 950 are removably inserted on or behind their respective side.

In some embodiments car seats 920, 930 and/or 940 and 950 are each twice folded car seats having a one quarter car seat base profile.

In other embodiments combined car seats 920 and 930 form a single car seat 920/930 with a half car seat base profile for seat 920/930. Also combined seats 940 and 950 form a single car seat 940/950 with a half car seat base profile for seat 940/950.

In some cases the 'Vee' back embodiment is combined with the side mounted car set embodiment to have 'Vee' mounted and side mounted car seats.

Figure 10D:
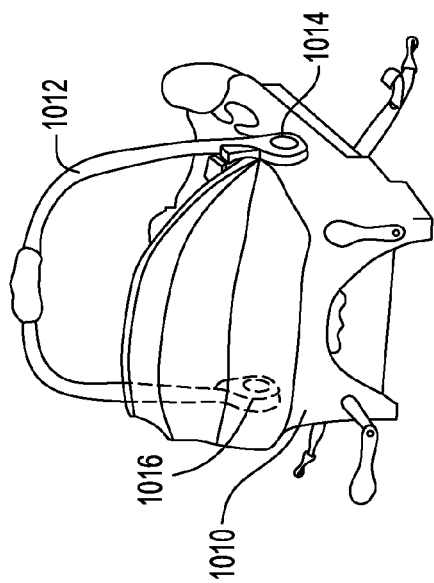
FIG. 10A-D show an example of an integrated car seat system embodiment of two booster seats each mounted on a side of an infants seat being with the ability to accept a car seat insert in accordance with the present invention.
Figure 10C:
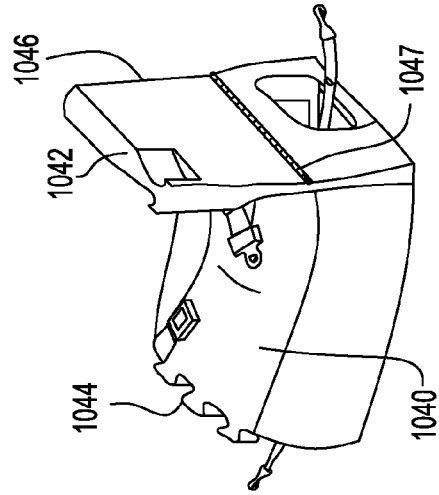
Figure 10A:
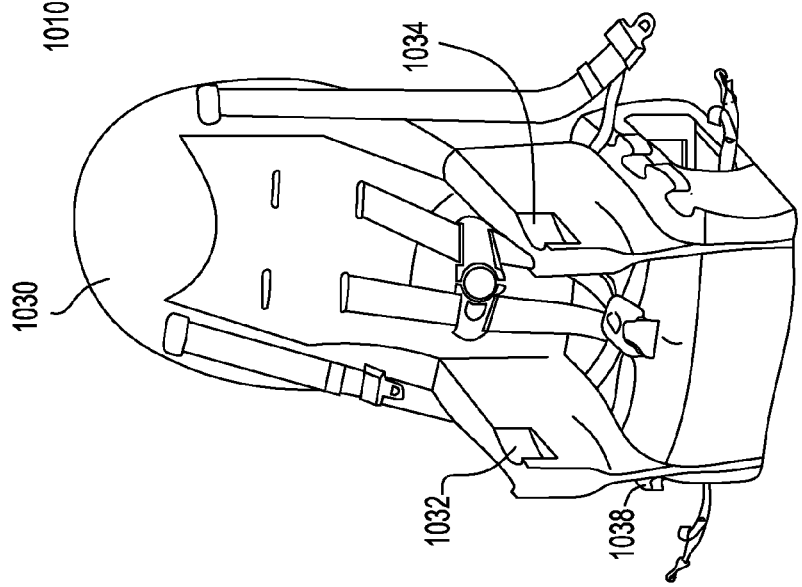

FIGS. 10A, B, C and D show a still further embodiment of providing one or more car seats with the ability to accept a car seat insert. The car seat insert is such as to change the type and use of the car seat into which it is inserted to provide a different car seat user seating capability. For example, a typical car seat insert 1010 is shown in FIG. 10. In this example car seat insert 1010 is shown as a rearward facing insert. It may be inserted into car seat 1030 of FIG. 13A to change car seat 1030 providing car seating for a forward facing car seat user. Car seat 1030 is referred to as a receiving car seat. The handle 1012 of car seat insert 1010 is such has to have one insert mechanism 1014 at one of its ends and another insert mechanism 1016 on its other end. The insert mechanism 1014 and 1016 of car seat 1010 are inserted into insert receivers 1032 and 1034 of car seat 1030 respectively.

Figure 10B:
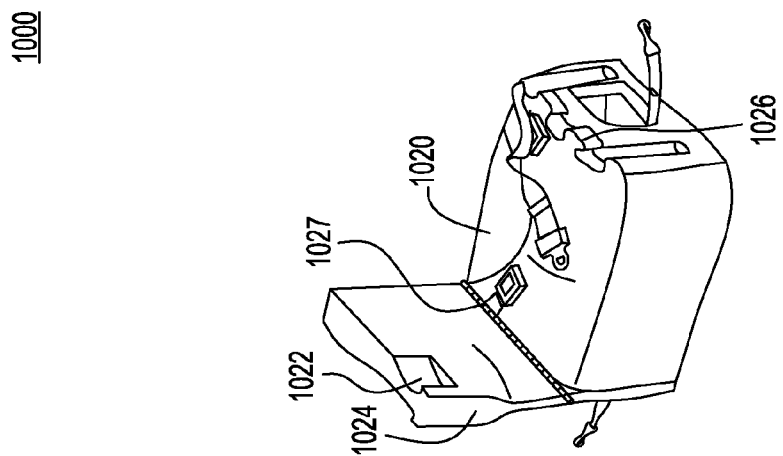

When seats 1000 provides a single seat booster seats 1020 is mounted on side 1032 of seat 1030 and booster seat 1040 is mounted on side 1034 of seat 1030. An additional car seat position is provided by removing booster seat 1320 from seat 1330 as shown in FIG. 10B. Another car seat position is provided by removing car seat 1340 from seat 1330 as shown in FIG. 10C.

In order to form a two position car seat system booster seat 1040 is attached to car seat 1030 by interconnecting male fingers 1044 of car seat 1040 with female fingers 1036 of car seat 1030. This provides a two seat car seat system for one infant seat user and one booster seat user. When booster seat 1040 is attached to car seat 1030, the booster seat can be changed to provide seating for second infant seat user by inserting car seat insert 1010 over booster seat 1040. This is accomplished by inserting insert mechanisms 1014 and 1016 of car seat 1010 into receiving mechanism 1046 of booster seat 1040 respectively.

In similar fashion, booster seat 1020 can be attached to infant seat 1030 by inserting male fingers 1038 of seat 1030 into female fingers 1026 of booster seat 1020. When booster seat 1040 is also attached to infant seat 1030, this forms a car seat system with three seating positions. In like manner, booster seat can be changed to provide seating for an infant by inserting a car seat insert such as 1010 into booster seat 1020 by inserting infant seat 1010 insert mechanisms 1014 and 1016 of infant seat 1010 into receiving mechanism 1022 of booster seat 1020 and into receiving mechanism 1032 of infant seat 1030. In like manner, positions may be made for 4, 5, 6, etc car seat users. This is particularly useful in a large van, bus or water vehicle.

This novel concept is also useful to change all seats of the three seat car system formed by seats 1020, 1030 and 1040 to provide seating for three infants by using two car seat inserts such as car seat insert 1010. It is noted that although seat insert 1010 is shown as a rearward facing insert, this concept is similarly applicable to a forward facing insert. Thus this concept is useful to reversibly change a single car seat or any number of car seats of a car seat system to-and-from a booster seat to a forward or rearward facing infant seat and/or a forward facing changing seat to a rearward facing infant seat. Use of the insert mechanisms described is just another example of a novel method to connect a car seat insert into a car seat.

Figure 10E:
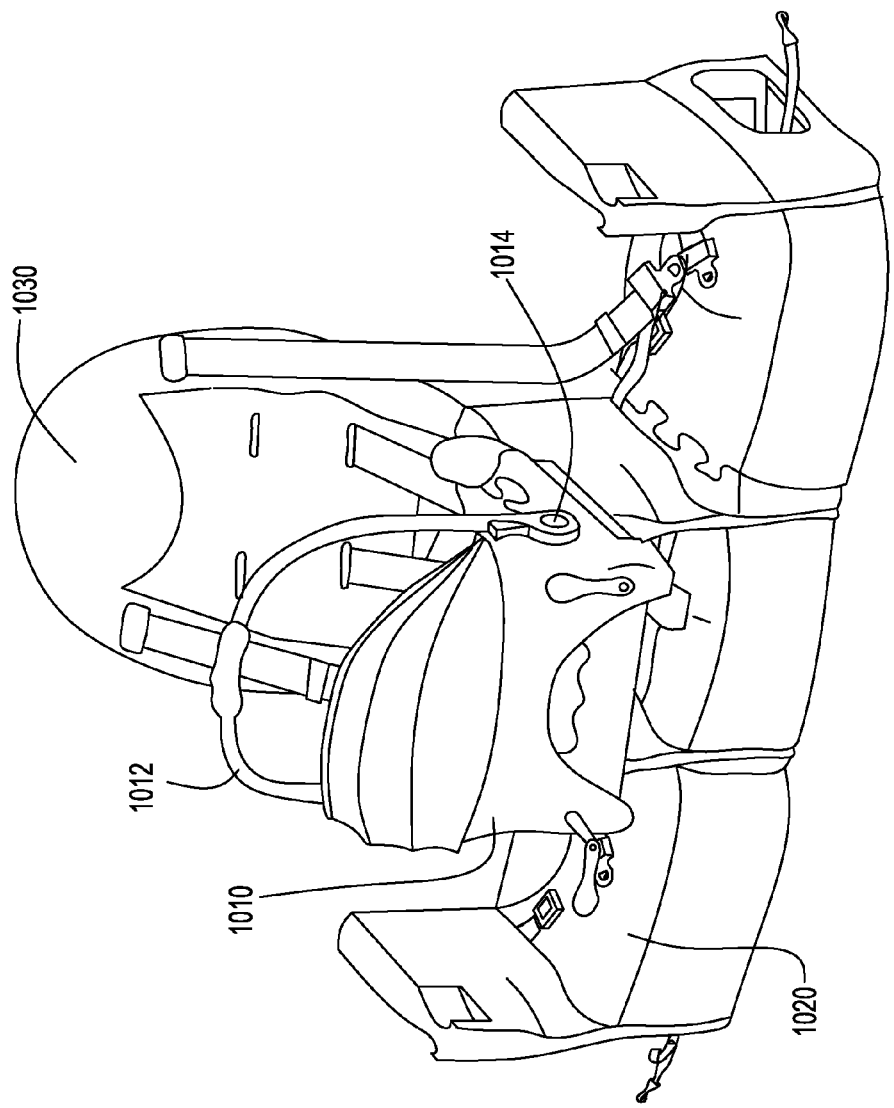

FIG. 10E shows an example of a three car seat integrated car seat system including booster seats 1020 and 1040, and infant seat 1030 with car seat insert 1010 inserted within car seat 1030. It is noted that FIG. 3E may also be viewed as an integrally constructed three position multiple car seat having positions 1020, 1030 and 1040. Booster seats 1020 and 1040 are mountable on the sides of infant seat 1030. This may be any hinge-like snap fit or other known mounting method. In some embodiments the side of booster seat 1020 is sometimes closable with 1024 hinge 1027. Also the side 1046 of 1340 is sometimes closable using hinge 1047. As shown, multiple car seat 1000 has a car seat insert 1010 inserted into its central seat 1030. The central seat 1030 formed for a forward facing infant seat user and is changed to provide seating for a rearward facing infant seat user, Although FIG. 10E shows a particular car seat combination, other car seat combinations are similarly formed using the concepts of this invention. For example, the central car seat of FIG. 10 can be a booster seat and/or any of the outside car seat positions may be an infant seat. Each of the seats may be formed to include any of the car seat bases discussed above, each with particular advantages.

qqqqqqqqqqqqqqqqqqqqqqqq

It is further noted that other horizontal profiles and/or other folding lines are advantageous in some applications. The profiles and folds shown here are to be considered examples only. These are used to illustrate the new basic concepts. Others are evident providing particular advantages for particular applications of these concepts.

Any or all of the seats in system 300 are sometimes made to be rolling car seats depending on the provision of wheels, handles and/or protruding seat rests. When some or all seats are provided with wheels, one, two or three car seat users can be rolled together. The same is the case for car seats in FIGS. 4-10. Car seat systems and/or individual or combined car seats have embodiments wherein each becomes a rolling car seat. In some embodiments combined seats are combined such that car seat users are seated side to side in front of one another and/or both wherein some users are side-to-side and others are in front of one another.

Other embodiments have other implementations than the implementations and/or methods shown in the present figures for meeting concepts satisfied by the present invention are useable to result in the novelties described. This includes seat integration, combination, seat roll ability. This also includes concepts of use of indentations, separator, support and attachment mechanisms advantageous in accordance with particular car system or seat requirements and designs. Some of these concepts and implementations are not always used. Also, the support and attachment mechanisms need not be the same for all car seats. The attachment and support mechanisms need only be compatible with each other and serve the application and specific design actually implemented. Some mechanisms include a spring loaded pin manually or mechanically coupled and decoupled from capturing or non-capturing pin inserts.

In some embodiments of the present invention, each car seat also employs a seat belt of the vehicle. In some cases this may be the same seat belt employed by the first car seat. In some cases this requires use of a seat belt extender to properly restrain the car seats. In some cases there is further provided a special seat belt and/or harness for one or more of the car seats to restrain the person in that car seat.

As previously stated, it is known in the art that car seats are designed that have the car seat person in the car seat to face the front of the car vehicle seat, whereas others car seats are designed that have the car seat person in the car seat to face the rear of the car vehicle seat. This variation is particularly useful in the present invention, which provides for seating of car seat persons face-to-face, where at least one car seat person faces the front of the car vehicle seat, whereas at least one others car seat person faces the rear of the vehicle seat.

In a particular aspect of the present invention, separate car seats are designed such that when attached together by support and/or attachment mechanisms the combined attach seats use a vehicle seat width generally allocated to a single vehicle passenger.

It is advantageous to sometimes implement the car seat system in which car seat bases of separate seats are different form one another and are used alternately. In some embodiments, a first car seat center uses modified trapezoidal car seat bases and/or at least one car seat center uses modified trapezoidal car seat base. Alternating different car seat bases may advantageously be employed with bases being inline with each other, or by offsetting the car seat bases. Sometimes an extra wide base is used to provide extra width space for a car seat user needing extra width space, for example as is needed for an obese child or handicapped car seat user. In all these cases, the car seat is designed to be compatible with the car seat base used. When the car seat base is for a booster seat, the car seat center back is often minimized or not used.

Generally, when a seating position of a car seat system is allocated to a booster seat the car seat center has no car seat back. In these cases, the back of a person using a booster seat would generally be on the vehicle seat back and facing the seat front to allow the booster seat user to dangle his/her legs. A person sitting adjacent to the booster seat person would advantageously be placed on a seat base facing the seat back. Booster seat users may also be placed adjacent to each other using seat bases as appropriate to that seating.

Preferably, some car seats are designed such that the portion of the car seat holding the main body of the person in the seat is wider than the portion of the car seat provided for the legs of the person in the seat.

It is noted that the car seat support and attachment mechanism in an integrated car seat may be implemented in ways known previously for connecting two parts. This includes but is not limited to pin and insert mechanisms, sliding mechanisms, snap fit, male to female mating connections, sexless connection mechanisms, etc. In some embodiments, these connections require and/or employ a connection release mechanism to disconnect attached seats or are disconnected manually. These implementations are best chosen to satisfy particular car seat implementation requirements.

In still other embodiments of the integrated car seat system, the system is designed for two or more car seat persons to provide at least one very wide car seat base for meeting special requirements of a special car seat user. Some embodiments use a combination of car seat bases that are each wider, equal to or narrower than the car space width provided for a regular passenger in a regular vehicle seat. This depends on each particular need and application.

Sometimes the integrated car seat system comprises one of: a combination of infant seats, a combination of booster seats and any combination of infant seats and booster seats.

It is noted that generally each booster seat has a receiving mechanism for receiving a lap/shoulder belt system. This sometimes uses the belt of the vehicle with an extension as required by the seat design.

It is noted that in some integrated system embodiments there is a combination of only two individual seats. This may be two individual booster seats, two individual infant seats or one infant seat and one booster seat. Although the infant seat shown is forward facing in these example embodiments, any or all of the infant seats may be rearward facing.

It is often advantageous to enable, for example, a parent of users of a car seat to change the types and/or configuration of one or more the seats provided in a car seat system. This is embodied by allowing insertion of a car seat insert to change the type of car seat in a particular car seat user position.

The ability to change from and to one car seat type to another car seat type is advantageous even for a single car seat. In this embodiment this is accomplished by addition or removal of an insert to the car seat. Thus a booster car seat can be charged to either a forward facing or a rearward facing car seat. A forward facing car seat can be changed to a rearward facing car seat.

It is noted that use of a hinge is just one of many embodiments. The word hinge as used herein is meant to illustrate a means of coupling components. It is understood that the word hinge refers to a coupling, or coupling mechanism. This could a hinge, a snap, a hook and eye, a strap, a bracing member, a material attachment and/or a combination of these or the like. Thus, in some embodiments some or all of the components are connected by a connecting material, hooks, snaps, zippers, braces and/or straps and any coupling device or method. This is in place of or in combination with using hinges. In some cases the components are held in a particular desirable position by metal or any suitable material. In many cases the hinge coupling is such as to enable separation of the objects hinged together.

Thus in accordance with the present invention there is provided for at least one seat of an integrated car seat system an insertable car seat module which includes a receiving car seat of a first type having receiving mechanism to receive a car seat insert. The car seat insert has inserting mechanism to couple with the receiving mechanism and changing the first type car seat to a second type car seat.

It is further noted that other methods of inserting a car seat insert into a car seat may be used employing the concepts of this invention. Some embodiments enable insertion of a plurality of car seat inserts into a car seat system and/or a multiple car seat. Generally, car seat inserts are removable to enable continued usage of the car seat into which it is inserted to revert back to its original form and use. In some cases insertion of the car seat insert is purposely made to be permanent according to a particular application where it is used.

It is still further noted that the concept of inserting a car seat into another car seat is also advantageously used with any singular car seat. Almost any existing or to be manufactured car seat can be used to be a receiving car seat. Generally, this is accomplished by providing either a specific or universal insert receiver for that receiving car seat. This allows the capability to advantageous change any car seat to provide a desired use of that car seat which is only available by providing that car seat with a car seat insert. In some embodiments an insertable car seat is designed to have universal insert mechanism allowing it to be inserted into almost any singular car seat. In some embodiments a insert receiving car seat is designed to have universal receiving mechanism allowing it to receive almost any insertable car seat.

Thus, it is further noted that an insertable car seat can be used with any single or multiple car seat of any manufacturer, make or model. Just as the concept of an insertable car seat can be used to change a forward facing car seat to a backward facing car seat it can be used to change a backward facing car seat to a forward facing car seat. This uses an interconnecting mechanism formed for the car seat that is receiving the insertable car seat being compatible with the mechanism of the insertable car seat.

In still a further advantageous concept, the present invention provides car seat designs for car seats that can be reversibly changed from one car seat type to at least one other car seat type. In this context, a booster seat, a forward facing infant seat, a rearward facing infant seat are said to be of a different 'type'. The word 'changeable' is used is used to mean changing from one 'type to another 'type. Thus a changeable car seat can be changed from a booster seat into either a forward facing infant seat, a rearward facing infant seat, or into both a forward and rearward facing infant seat.

The integrated car seat system is particularly useful and appropriate to provide one or more car seats integrated into a car seat built into using the concepts of this invention vehicle, one or more additional car seats are mounted under, on top of, on a side of and/or a back of the built in car seat. These additional car seats are mounted removably for use in the vehicle any appropriate car seat placement position.

Figure 6A:
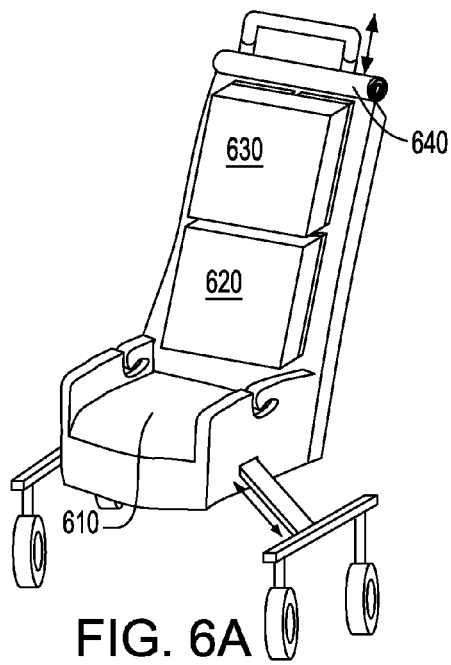
FIG. 6 shows an example of an integrated car seat system wherein one or two separate car seats are mountable on a back of a third car seat in accordance with the present invention.
Figure 6B:
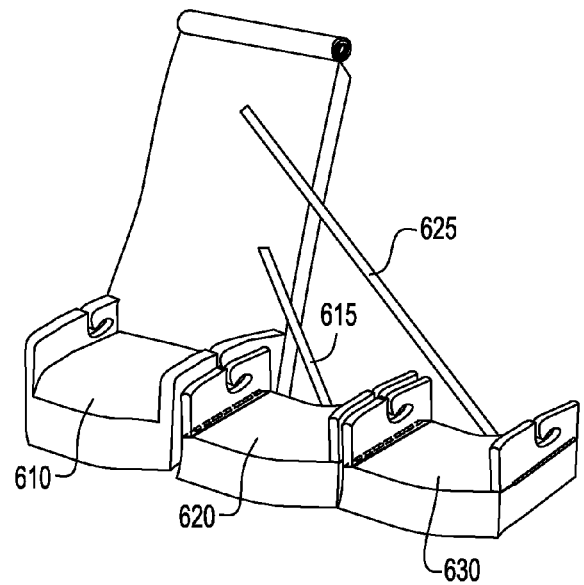

An alternative embodiment of an integrated seat system 600 includes a plurality of individual car seats as shown in FIG. 6. It shows a combination of three seats mounted in the integral package 600. Seats 620 and 630 are both separately detachably mounted on the back of seat 610, seat 630 being above seat 620. When so mounted, seat 600 provides seating for a single car seat person at the seat base of seat 610. When desired either seat 620 and/or seat 630 are/is removed and separately mounted in the vehicle seat to provide seating for another car seat person.

In some embodiments one or more of the separate car seats include a drawer for storing objects as desired by the user.

The mechanisms may include simple or complex mechanisms or even force-fit, snap-fit and unfit, and force back and forth release mechanisms. In a preferred embodiment all seat members of an integrated car seat are identical. Each seat is formed to be able to capture a member seat and also be captured by another member seat. Thus each member seat includes capture/release mechanism and attachment mechanism. This design allows the integration of many identical seats. This is generally limited by height and space consideration. In some cases a first car seat of the integral unit has only capture and release mechanisms to capture, release and re-capture an integrated seat member.

Member seats of integrated car seat systems are removably attached using any known method for attachment, release and reattachment. These include force fitting, straps, snaps, springs, hooks and eyes, belts, braces, supporting braces and the like, or any combination of these.

It is noted that generally each seat in an integrated seat car system is a self contained car seat capable of being mounted in the vehicle seat to provide seating for a car seat user. In some case external hardware and/or components are used.

In another embodiment of an integrated car seat system, each car seat member seat is formed having a plurality of components. In this case, a member car seat includes a member seat base and a member seat upper portion. Sometimes a first member car seat is an integral car seat. Other times any member seat may be used as the first member car seat. All member seat base portions removably attached to the base of the first car seat are one on top of another and all member seat upper portions members are removably attached to the upper portion of the first member car seat.

Sometimes a member car seat base includes member seat right and left ends. Sometimes it also includes a portion to be formed as a back for a rearward facing car seat position. Sometimes the member seat upper portion includes a member seat back particularly when used as a forward facing car seat position. In some cases at least one of the member seat upper right and left ends and member seat back are folded within the member seat base and upper portion respectively to obtain a reduced package In some embodiments the first member car seat is a pre-existing, or to be manufactured car seat into which car members are packaged as disclosed in this invention. This in general, almost any particular car seat of any manufacturer and model can act as the first car seat of an integrated car seat system. This includes individual infant car seats, booster car seats and multiple car seats of any manufacturer. This is accomplished by adapting one or more integrated member car seats to be placed under the base portion and/or on top of the upper portion of the particular car seat. In some cases a two piece integrated car seat member is used with the member seat base being removably attached under the particular car seat and the member seat upper portions removably attached to an upper portion of the particular car seat.

In some embodiments of any of the car seat seats and/or systems, external mounting hardware and/or components are used for mounting one integrated car seat member to another and/or for mounting an individual removed car seat member to the vehicle seat.

It is noted that generally any manufactured booster seat and any manufactured infant or other car seat can be made to accommodate one or more seats placed under or above that manufactured seats. Many embodiments of the various car seats described use a pad covering the back and/or base portions for seating comfort.

It is further noted that in many cases, individual car seat positions of a car seat in a car seat system, a multiple car seat and an integrated car seat system are often capable of receiving an attachable tray. The tray may be used for aiding child feeding and/or providing game and/or playing objects etc.

Generally, a single car seat is packaged as a single car seat to provide seating for a single car seat user. A multiple car seat is packaged as a plurality of car seats to provide simultaneous seating of a plurality of car seat users in seats adjacent to each other. An integrated car seat is packaged as a plurality of car seats atop one another. As initially packaged it provides seating for a single car a seat user. It provides additional seating for other car seat users only in seats that are removed from the initial integral package.

In some embodiments, there is a combination of multiple seats with integrated seats. For example lets consider at least one (or all) of the three seats multiple package shown in FIG. 11 may be an integrated package of three seats set on top of one another. This alleviates car seat storage problems when car seats are not all used. Thus a seat 1026 is a triple booster seat packages as a three high integrated seat, the multiple seat could provide ultimate seating for up to five or more car seat users, and so on.

In some embodiments the first member car seat is a pre-existing car seat, or to be manufactured car seat, into which car member car seats are packaged as disclosed in this invention. Thus in general, almost any particular car seat of any manufacturer and model can act as the first car seat of an integrated car seat system. This includes individual infant car seats, booster car seats and multiple car seat of any manufacturer. This is accomplished by adapting one or more integrated member car seats to be placed under the base portion and/or on top of the upper portion of the particular car seat. In some cases two piece integrated car seat members is used with the bases removably attached under the particular car seat and the member seat upper portions removably attached to an upper portion of the particular car seat.

In another embodiment of an integrated car seat system, each car seat member seat is formed to include a member seat base and a member seat upper portion. Sometimes a first member car seat remains in the integral unit. Other times, any member seat may be used as the first car seat. All member car seat bases are removably attached to the base of the first member car seat one on top of another and all member seat upper portions are removably attached to the upper portion of the first member car seat one on top of another.

Sometimes, a member car seat bases includes member seat right and left ends. Sometimes it also includes a portion to be formed as a back for a rearward facing car seat position. Sometimes the member seat upper portion includes a member seat back particularly when used as a forward facing car seat position. In some cases at least one of the member seat upper right and left ends and member seat back are folded within the member seat base and upper portion respectively to obtain a reduced package.

As previously stated, in some embodiments external mounting hardware and/or components are used for mounting one integrated car seat member to another and/or for mounting an individual removed car seat member to the vehicle seat.

It is noted that generally any manufactured booster seat and most any manufactured infant car seat can be made to accommodate one or more seats placed under or above that manufactured seat. It is preferred to removably attach booster seats under a manufactured seat, especially when the manufactured seat is an integral multiple car seat. In this case, a number of member car seats are mountable under the multiple car seat. However, even in this case integrated member car seats may be mounted above any or all car seat positions in an integral or non-integral multiple car seat.

The novel car seat concepts described above may also be used together or separately in order to get the best advantage for a particular user requirement. The particular embodiments described and/or shown are to be considered as illustrating the particular concept and should not be considered to limit the concept to particular description and/or drawing. Thus, any embodiment using any of these concepts is included as being protected by this invention as claimed herein.

Thus, although this description uses words like 'car', 'vehicle', 'car seat', etc, it should not be limited by these words. This invention is similarly applicable to seating 'car seat users' in any air, water and other land vehicles, etc. The singular car seats, car seat systems and multiple person car seats of this invention are applicable to booster seat and non booster seat combinations. The vehicle of the present invention may be any land vehicle, any air vehicle or any water vehicle.

It is still further noted that the particular implementations described above should only be considered as specific examples of enabling implementations of the concepts and novelties of this invention. Other implementations are also suitable to use the concepts of this invention to obtain the advantages of this invention. These include locations and types of support and attachment mechanism and/or the separator, the car seat sides, car seat insert and insert mechanisms, variable width seat backs and or seat bases of car seat centers and width control or setting mechanisms, and/or multiple person car seats, modularity of certain parts, car seat entities, dual car seats, etc. These and other implementations are similarly protected by the claims and concepts of this invention.

It is also noted that the figures are generally not drawn to scale. Thus the drawings do not particularly represent the relative sizes of one object to another object in a figure.

What is claimed is:

1. An integrated car seat system comprising:
   an integral unit comprising a combination of individual car seats commonly packaged to provide a single car seat to seat a single car seat user, said integral unit takes up a single vehicle car seat position,
   each individual car seat of said combination being mechanically attached to at least one other seat and detachable from said integral unit to provide seating for another car seat user when said each individual car seat is removed from said integral unit,
   said integral unit and said each individual car seat being mountable in a vehicle seat of at least one of: a land, sea and air vehicle when providing seating for said car seat user.

2. An integrated car seat system as recited in claim 1, wherein when said each individual car seat is removed from said integral unit, said individual car seat becomes a removed car seat, and when said removed car seat is not needed to seat said another car seat user said removed car is re-attachable to said integral unit.

3. An integrated car seat system as recited in claim 1, further comprising a limitation taken from a group of limitations consisting of:
   wherein said combination is any combination of infant seats, toddler seats, booster seats and foldable seats;
   wherein at least one of said individual car seats further comprises:
       car seat wheels to enable said at least one of said individual car seats to be used as a rolling car seat, and
       a car seat handle usable to push at least one car seat user seated in said rolling car seat, and
   wherein at least one of said at least one of said individual car seats further comprises a foot rest to provide support for legs of said at least one car seat user;
   wherein at least one individual car seat is one of: a dual car seat, a car seat with overlap, a variable width car seat, a changeable car seat, a car seat insert, a car seat having receiving mechanism for a car seat insert, a car seat in a car seat system, and a car seat in a multiple car seat;
   wherein an end user is able to purchase and use only that portion of the integrated car seat system required at a particular time;
   wherein an end user is able to add individual car seats to the integral unit as additional car seat positions are needed;
   wherein each additional car seat is removably attached to a previously attached car seat in the integrated car seat system,
   forming at least one part of a multiple car seat system or any car seat system;
   wherein said multiple car seat or any car seat system has two or more car seating positions, and at least one seat of said seating positions is formed of a plurality of car seats mounted on at least one of: a top, a side, and a back of one another;

wherein at least one car seat of said combination of car seats is one of: an existing car seat, a manufactured car seat, a modified car seat, and a car seat to be manufactured;

wherein at least one car seat of said combination of car seats is formed from a plurality of components including at least two components taken from a group of components consisting of:

an integrated car seat base, an integrated car seat back attached to one of: said car seat back and a car seat base of another car seat of said combination of car seats, an integrated car seat right end attached to one of: said car seat back and said car seat base, and an integrated car seat left end attached to one of: said car seat back and said car seat base;

wherein said at least one car seat of said combination of car seats being form-able to be one of: a booster seat, a forward directed car seat, a rearward directed car seat, a variable width car seat, a dual car seat, and an overlapping car seat;

wherein each car seat base is removably attached to another car seat base of said combination of car seats;

wherein at least one of said combination of car seats comprising at least one of: a capturing mechanism capable of capturing another seat of said combination of car seats, an attachment mechanism enabling each said individual car seats to be captured by the capturing mechanism of another seat of said combination of car seats, and a release mechanism enabling release of at least one individual seat from said another seat of said combination of individual car seats and being removed from said integral unit;

wherein at least one of said individual car seats comprising a release mechanism enabling release of each of said individual car seats from another of said combination of individual car seats and being removed from said integral unit;

wherein said integral unit further comprises a release mechanism to release any number of said combination of individual car seats from said integral unit;

wherein each of said mechanisms comprise one of: a simple mechanism, a complex mechanism, an external component mechanism, a force fit, manual control mechanism, a sliding control mechanism, a gearing system control, and a snap/unsnap mechanisms;

wherein said each individual car seat is one of: an infant seat, a booster seat, a toddler seat, a variable width car seat, a forward directed car seat, a rearward directed car seat, a car seat for a handicapped car seat person, a car seat mountable on a rear of a particular vehicle car seat, a car seat capable of accepting a car seat insert, a car seat insert, a dual car seat, a car seat with overlap, a variable width car seat, a changeable car seat, a car seat in a car seat system, and a car seat in a multiple car seat system, and any combination of these said car seats;

wherein a built-in seat belt of the vehicle includes a car seat mounting medium;

wherein at least one individual car seat is removed from said integral unit by unfolding said individual car seat from said integral unit to form an adjacent car seat;

further comprising at least one of: a car seat pad for covering at least one of: a back and a base portion, of at least one of said individual car seats, an external mounting component to mount at least one of said each said individual car seat to said integral unit, and an external releasing component to release at least one of said each said individual car seat from said integral unit;

wherein at least one of said each individual car seats is formed having at least one external component;

wherein at least one of said individual car seats of the integrated car seat system is an insertable car seat module comprising a receiving car seat of a first car seat type having receiving mechanism to receive a car seat insert of a second car seat type;

wherein the car seat insert includes inserting mechanism to couple with said receiving mechanism and changing said first car seat type car seat to said second car seat type car seat;

wherein said insertable car seat module is formed to seat a car seat person in the vehicle seat;

wherein the insertable car seat forms at least one seat in one of a car seat system and a multiple car seat; and wherein at least one of said combination of individual car seats, provides features and amenities of previously known and developing car seats;

wherein at least a portion of at least one of said combination of individual car seats is folded within said combination of individual car seat to result in a reduced package size;

wherein external mounting components are used for at least one of: mounting one individual car seat to another and mounting an individual removed car seat to any vehicle seat;

further comprising a car seat belt extender;

wherein at least a portion of at least one of said combination of individual car seats is folded within said combination of individual car seat to result in a reduced package size;

wherein external mounting components are used for at least one of: mounting one individual car seat to another and mounting an individual removed car seat to any vehicle seat;

wherein at least two of said combination of individual car seats are held together by at least one telescopic tube;

wherein at least one combination of said combination of individual car seats is held together by a tying body;

wherein at least one of said combination of individual car seats includes grooves to accept sides of another car seat;

wherein at least one of said combination of individual car seats is attached to another car seat with at least one of:
a flap; and
a rod mechanism,
used to attach two car seats together to form adjacent car seats when said at least one of:
flap; and
rod mechanism,
is placed in an open state;

wherein said at least one of:
flap; and
rod mechanism,
is detachable to make seats attached by said flap and rod mechanism independent of one another;

wherein at least one base of at least one of said combination of individual car seats is foldable to reduce a base profile of said at least one base to reduce a package size of said at least one of said combination of individual car seats and forming a foldable car seat;

wherein said folded car seat is partially mounted on another car seat on a combination of at least two of base, side and back;

wherein said folded car seat is folded in two, with part of the folded car seat mounted against a side of one other car seat and a remainder of the folded car seat being mounted on one of side, base and back of said one other car seat;

wherein at least one of said combination of individual car seats is foldable to reduce horizontal and vertical profile of a car seat object included in another car seat object;

wherein at least one of said combination of individual car seats is foldable to reduce said foldable car seat to have a quarter car seat base horizontal profile;

wherein at least one foldable car seat is mounted on another car seat, when said foldable car seat is not used for a car seat user;

wherein when any foldable car seat is removed from a mounting in any car seat, said foldable car seat is at least one of: un-foldable and removable, to provide seating for another car seat person;

wherein at least one of said combination of individual car seats has a variable height car seat base having a car seat base height variable by a ladder mechanism;

wherein said integrated car seat system includes at least one car seat having a 'Vee' shaped back formed of two sides;

wherein each of said two sides is used to mount at least one foldable car seat;

wherein said at least one foldable car seat is removably inserted in one of: a front and a back of a respective side;

wherein at least one of said combination of individual car seats is a receiving car seat capable to accept a car seat insert;

wherein said car seat insert changes a type and use of a particular car seat into which said car seat insert is inserted to provide a different car seat user seating capability;

wherein said car seat insert changes the receiving car seat from one of:
  booster seat to infant seat,
  forward facing seat to rearward facing seat,
  rearward facing seat to forward facing seat,
  child seat to infant seat;

wherein a plurality of said combination of individual car seats have car seat bases different from one another;

wherein sad car seat bases include any combination of:
  rectangular car seat base,
  trapezoidal car seat base,
  modified trapezoidal car seat base,
  offset car seat base,
  wide base,
  narrow base,
  base without car seat back, and
  alternating car seat bases;

wherein each car seat is one of: an infant seat, a booster seat, a toddler seat, a variable width car seat, a forward directed car seat, a rearward directed car seat, a car seat for a handicapped car seat person, a car seat mountable on a rear of a particular vehicle car seat, a car seat capable of accepting a car seat insert, a car seat insert, a dual car seat, a car seat with overlap, a variable width car seat, a changeable car seat, a car seat in a car seat system, and a car seat in a multiple car seat system, and any combination of said car seats; and any combination of said limitations.

4. A car seat comprising one or more car seats being a combineable car seat useable as one or more individual car seats of the integrated car seat system of claim 1.

5. A car seat as recited in claim 4, further comprising a limitation taken from a group of limitations consisting of:

a capturing mechanism capable of capturing another seat of said plurality of combineable individual car seats, an attachment mechanism enabling said car seat to be captured by the capturing mechanism of another seat of said plurality of combineable individual car seats;

at least one external component to keep together a particular combination of combinable individual car seats;

wherein each of said mechanisms comprise one of: a simple mechanism, a complex mechanism, an external component mechanism, a force fit mechanism, a manual control mechanism, a sliding control mechanism, a gearing system control, and a snap/unsnap mechanism; and a component enabling attachment of said combinable car seat to another car seat.

6. A car seat component comprising at least one part used to form a car seat into the combinable car seat of claim 4, and is useful for one of:
  use in forming a particular integrated car seat system, and
  being part of the particular integrated car seat system.

7. A car seat component as recited in claim 6, further comprising a limitation taken from a group of limitations consisting of:

a capturing mechanism capable of capturing another seat of any combination of combinable individual car seats, and an attachment mechanism enabling said car seat to be captured by the capturing mechanism of another seat of said any combination of combinable individual car seats;

wherein at least one of said any combination of combinable individual car seats, provides features and amenities of previously known and developing car seats;

further comprising wheels for a rolling car seat, and at least one of: a handle and a protruding seat rest;

further comprising a car seat belt extender;

being formed for at least one of: a land vehicle, a water vehicle, and an air vehicle;

wherein each car seat is one of: an infant seat, a booster seat, a toddler seat, a variable width car seat, a forward directed car seat, a rearward directed car seat, a car seat for a handicapped car seat person, a car seat mountable on a rear of a particular vehicle car seat, a car seat capable of accepting a car seat insert, a car seat insert, a dual car seat, a car seat with overlap, a variable width car seat, a changeable car seat, a car seat in a car seat system, and a car seat in a multiple car seat system, and any particular combination of said car seats; and wherein said car seat insert changes a booster seat to one of: a forward facing infant sea, a rearward facing infant seat, a variable width car seat, a variable height car seat and any combination of said seats.

8. A car seat component as recited in claim 6, further comprising at least one insertable car seat module comprising:

a receiving car seat of a first car seat type having a receiving mechanism to receive a car seat insert of a second car seat type, the car seat insert having inserting mechanism to couple with said receiving mechanism and changing said first car seat type car seat to said second car seat type car seat, wherein said insertable car seat module is formed to seat a car seat person in a vehicle seat, the vehicle seat made to provide at least one sitting position for a passenger in the vehicle, said car seat system being mounted in said vehicle seat employing a built-in seat belt of the vehicle.

9. A specific car seat comprising a plurality of foldable car seat portions forming said car seat, each foldable portion being attached to at least one other foldable portion to reduce a size of a horizontal profile of a seat base of said car seat by folding, said specific car seat useful for use as at least one of the individual car seats of claim 1.

10. A car seat as recited in claim 9, comprising a seat base having a first pair of first and second foldable portions foldable on each other, and a second pair of third and forth foldable portions foldable on each other to reduce the size of the horizontal profile of the seat base by about a factor of two.

11. A car seat as recited in claim 10, wherein said first pair is foldable on said second pair using any hinge-like mechanism to further reduce a size of the horizontal profile of the seat base by about another factor of two.

12. An integrated car seat system as recited in claim 1, wherein at least one car seat comprises a base portion and a ladder mechanism for raising and lowering a height of the base portion.

13. An integrated car seat system as recited in claim 1, wherein at least one of:
    said integral unit, and
    said individual car seats,
further comprises a car seat handle and car seat wheels, to form a rollable car seat, said car seat wheels enable said rollable car seat to roll any car seat user seated in said rollable car seat using said car seat handle, when said rollable car seat is removed from said vehicle.

14. An integrated car seat system as recited in claim 13, further comprising at least one limitation taken from a group of limitations comprising:
    wherein any rollable car seat further comprises a car seat foot rest to provide support for legs of said car seat user, said foot rest is at least one of: a pullout foot rest, and a protruding foot rest, said pullout foot rest has at least one of: no incline, a downward incline, and a rippled incline;
    wherein particular wheels are mounted on a respective car seat in one of: sides of the rolling car seat, tucked under the car seat in a releasable state, said wheels being released when the car seat is removed from the vehicle;
    wherein any wheels are at least one of:
        large relative to a rollable car seat size,
        emanate from a lower portion of the rollable car seat,
        have a wheel height mounting extender to raise a seat base from a floor upon which said rollable car seat is rolling;
    wherein any car seat handle is a foldable telescopic tube that can be folded and unfolded to tuck-in and/or otherwise minimize the length of an unused handle, said tube being extended when the handle is used to push said rollable car seat;
    wherein said rollable car seat includes a first car seat for seating a first car seat user and a second car seat for seating a second car seat user, when said first and second car seats are removed from said vehicle;
    wherein said first and second car seats being mounted in a manner to seat said first car seat user in front of second car seat user when said first and second car seats are removed from said vehicle;
    wherein said first and second car seat users face each other;
    wherein said rollable car seat uses at least one car seat handle;
    wherein said rollable car seat includes at least two side by side car seats for rolling at least two car seat users;
    wherein at least one of said at least two car seat users faces another car seat user;
    wherein said side by side car seats are mountable on one another when the rollable car seat is used for a single car seat user;
    wherein said rollable car seat includes at least two side by side car seats and at least another car seat mounted in front of said side by side car seats;
    wherein said side by side car seats are separable from each other to form two independent rollable car seats each for rolling one of: said first and second car seat users,
    each separable car seat having car seat wheels and one car seat handle;
    wherein spacing of wheels on a first side of the rollable car seat from wheels on an opposite side of the rollable car sea is variable; and
    wherein said wheels are detachably attachable to said rollable car seat.

15. An integrated car seat system comprising a combination of a first car seat being mechanically attached to a second car seat and detachable therefrom, said combination takes up a single vehicle car seat position, said second car seat being mountable on at least one of:
    a top of said first car seat;
    a base of said first car seat;
    a side of said first car seat;
    a back of said first car seat;
    under said first car seat; and
    any combination of said mountings
said second car seat to provide a single car seat to seat a single car seat person when said second car seat is removed from said combination, said first car seat to provide a seating position for an additional car seat person when said first car seat is removed from said combination, said integrated car seat system mountable in a vehicle seat employing a built-in seat belt of the vehicle seat of at least one of: a land, sea and air vehicle.

16. An integrated car seat system as recited in claim 15, further comprising at least one limitation taken from a group of limitations comprising:
    wherein at least one additional car seat is mountable in one of:
        on top of said second car seat;
        on a particular side;
        below said first car seat;
        between said first and second car seats; and
        any combination of said mountings,
    forming another combination of car seats, when said additional first and second car seats are mounted in said integrated car seat system said another combination of car seats takes up any single vehicle car seat position,
    wherein at least one of said car seats further comprises: car seat wheels; and a car seat handle, said car seat wheels enable at least one of said car seats to be used as a rolling car seat, said car seat handle usable to push at least one car seat user seated in one rolling car seat, and
    wherein at least one of said car seats further comprises a foot rest to provide support for legs of any car seat user seated in a particular rolling car seat.

17. A car seat system comprising:
    a car seat module to provide a seating position in a vehicle for at least one car seat user employing a seat belt of said vehicle, said car seat module being a particular car seat comprising one of:
    a single seat being a combinable car seat useable as an individual car seat of an integrated car seat system, said integrated car seat system comprising a plurality of combineable individual car seats combined to form an integrated car seat that seats a particular single car seat user, said integrated car seat system takes up a single vehicle car seat position and employs a built-in seat attachment of the vehicle, said plurality of individual car seats being mechanically attached to and detachable from to one another, each said combineable individual car seat being capable to provide a separate vehicle sitting position for another car seat user, said vehicle being at least one of: a land, sea and air vehicle.

car seat wheels attached to said car seat system to enable said at least one of said combineable individual car seats to be used as a rolling car seat, and a car seat handle attached to said car seat system usable to push at least one car seat user seated in said car seat when said car seat system is removed from said vehicle, said car seat being rollable using said wheels and said handle.

18. A car seat system as recited in claim 17, further comprising at least one limitation taken from a group of limitations comprising:

a foot rest to rest the feet of said car seat user;

wherein said footrest is one of: a protruding seat rest a pullout foot rest;

wherein said foot rest is one of: downward inclined and rippled;

wherein said wheels are detachably attached to said car seat;

wherein said handle is detachably attached to said car seat;

wherein said footrest is detachably attached to said car seat;

wherein said wheels are mounted on one of the sides of the rolling car seat;

wherein said wheels are mounted within the car seat in a releasable state, said wheels being released when the car seat is removed from the vehicle;

wherein said wheels are mounted tucked in the car seat in a releasable state, said wheels being released when the car seat is removed from the vehicle;

wherein said wheels are at least one of:

large relative to the rollable car seat size, emanate from a lower portion of the rollable car seat, have a wheel height mounting extender to raise a seat base from a floor upon which said rollable car seat is rolling;

wherein said car seat handle is a foldable telescopic tube that can be folded and unfolded to tuck-in and/or otherwise minimize the length of an unused handle, said tube being extended when the handle is used to push said rollable car seat;

wherein said rollable car seat includes attachment mechanism to attach a second car seat for seating a second car seat user, when said car seats are removed from said vehicle; and wherein spacing of wheels on a first side of the rollable car seat from wheels on an opposite side of the rollable car sea is variable.

19. A car seat system as recited in claim 17, wherein each car seat of said car seat system is one of: a dual car seat, a car seat with overlap, a variable width car seat, a changeable car seat, a car seat insert, a car seat having receiving mechanism for a car seat insert, a car seat in a car seat system, and a car seat in a multiple car seat; a car seat forming at least one part of a multiple car seat system or any car seat system.

20. A car seat system as recited in claim 17, wherein each car seat of said car seat system is at least one of: an infant seat, a toddler seat, a booster seat, a changeable seat, a foldable seat; an existing car seat, a manufactured car seat, a modified car seat, and a car seat to be manufactured.

\* \* \* \* \*